May 13, 1941.  D. O. PERRY  2,241,733
SLED
Filed Oct. 21, 1939   2 Sheets-Sheet 1
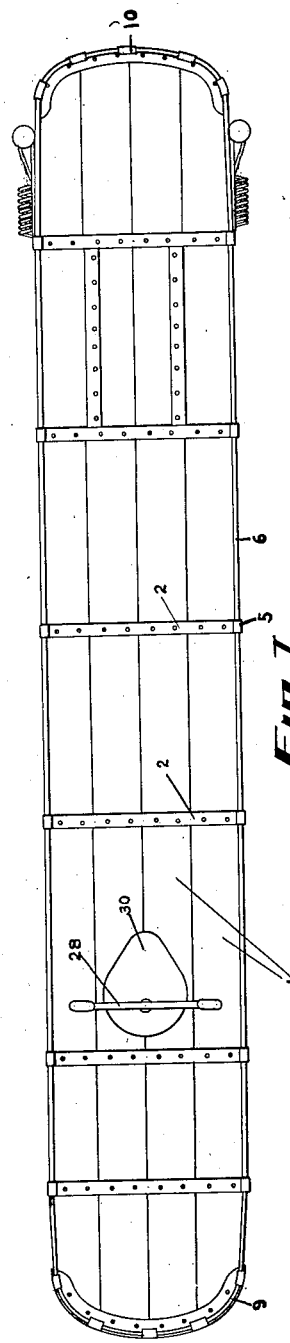
Fig I
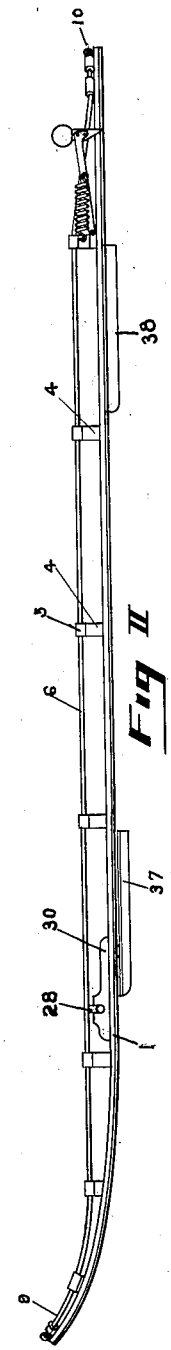
Fig II
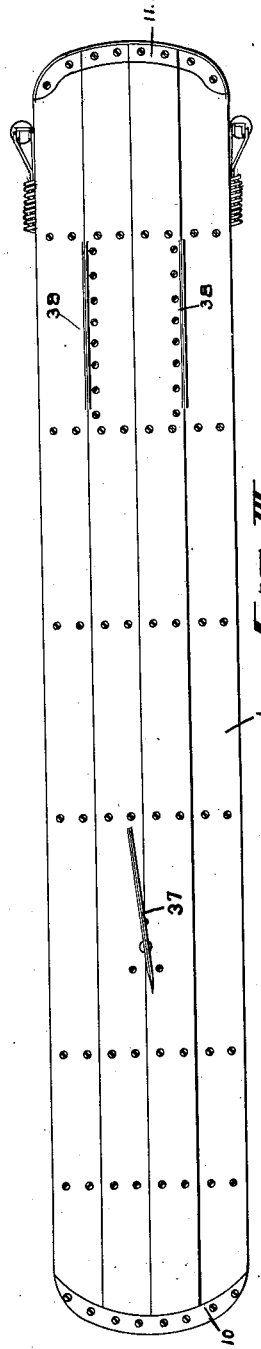
Fig III
INVENTOR
Datus O. Perry
BY
ATTORNEY May 13, 1941.  D. O. PERRY  2,241,733
SLED
Filed Oct. 21, 1939   2 Sheets-Sheet 2
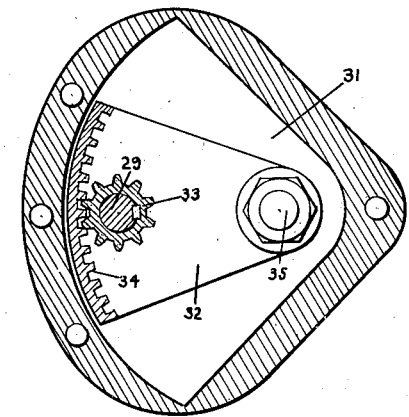
Fig IV
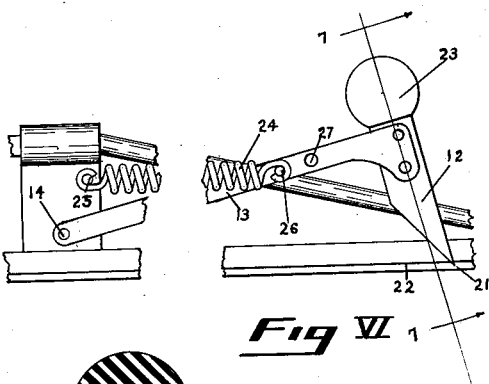
Fig VI
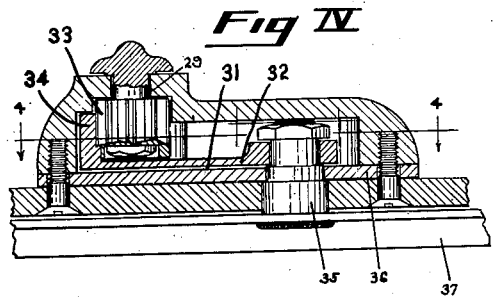
Fig V
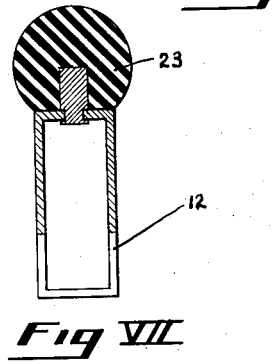
Fig VII
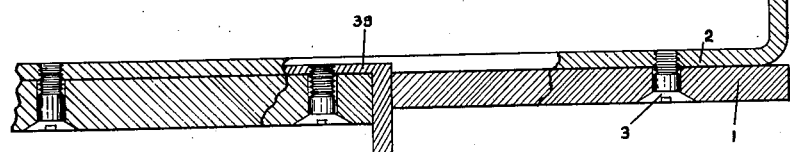
Fig VIII
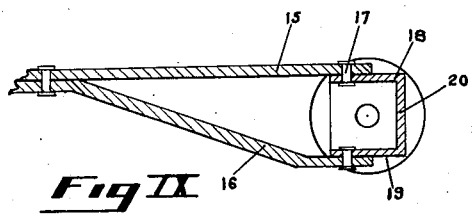
Fig IX
INVENTOR.
Datus O. Perry
BY *Thom B Bilyeu*
ATTORNEY.

Patented May 13, 1941

2,241,733

UNITED STATES PATENT OFFICE 2,241,733

SLED

Datus O. Perry, Washougal, Wash.

Application October 21, 1939, Serial No. 300,561

3 Claims. (Cl. 280—21)

The primary purpose and object of my invention is to provide a sled that may be used for pleasure purposes and for sporting purposes. The sled may be used as a take-off and landing device for making sporting jumps upon ski runways having for its object the accommodation for a number of occupants upon a single sled when the jump or slide is being made.

A further purpose and object of my invention is to provide a sled that may be occupied by a number of occupants and be used for speed purposes on slides and on skiways, and in which a hand rail is provided at the sides of the sled that may be grasped in the hands of the occupants of the sled and which may be made to lie flat upon the top sides of the runner boards of the sled at its ends.

I further provide a pair of brake shoes at the stern end of the sled and at either side thereof and provide facilities for maintaining the brake shoes out of contact with the surface over which the sled is operated, but provide manually manipulative means for placing either one or both of the shoes in immediate or surface contact with the surface over which the sled is being run.

A further object of my invention is to provide a sled for sporting purposes that may be braked from the rear, steered from the front and which may be kept in aligned running condition between the steering mechanism and the braking mechanism.

A still further object of my invention consists in so constructing the sled that the occupants of the sled may slide from the rear of the sled without being impelled upon any upwardly extending obstruction of any kind.

With these and incidental objects in view, the invention consists in certain novel features of construction and combination of parts, the essential elements of which are set forth in the appended claims and a preferred form of embodiment of which is hereinafter shown with reference to the drawings which accompany and form a part of this specification.

In the drawings:

Fig. I is a plan view of my new and improved sled.

Fig. II is a side view of the sled shown in Fig. I.

Fig. III is an inverted plan view of the sled shown in Fig. I and in Fig. II.

Fig. IV is a sectional plan view of the steering sector that is actuated by the tiller and that operates the rudder disposed central of and extends below the underside of the sled base.

Fig. V is a sectional side view of the mechanism illustrated in Fig. I and illustrating the rudder bar in fragmentary side view.

Fig. VI is a fragmentary side view of a brake mechanism shown in its normal raised inactive position.

Fig. VII is a sectional front view of the shoe and of the handle for actuating the same. This view is taken on line 7—7 of Fig. VI looking in the direction indicated.

Fig. VIII is a fragmentary sectional end view of the body, the base, the stanchion and the hand rail of the sled. This view also shows the guide bar disposed at the rear of the underside of the sled and downwardly extending therefrom.

Fig. IX is a sectional inverted plan view of the brake shoe and the arm for supporting the same.

Like reference characters refer to like parts throughout the several views.

I make my sled of a plurality of base runner boards 1, the same being made of high quality wood as hickory or white oak.

I provide a plurality of cross bars 2 that are disposed upon the top side of the runner boards 1 and secure the same thereto through the use of any suitable fasteners as through the use of countersunk screws 3. The countersunk screws 3 pass through the boards 1 and are threadably engaged with the cross bar 2 as illustrated in Fig. VIII. Each of the cross bars are upturned at their ends as illustrated at 4 to form stanchions to the top of which are secured short tubular members 5.

I place a hand rail 6 entirely around the sled. The hand rail is preferably comprised of a high quality rubber sheath 7 having a suitable fiber or flexible metal rope 8 extending therethrough. The hand rail 6 should be made sufficiently large and strong to permit the occupants of the sled engaging the hand rail at either side of the sled and to hold it firmly in their hands to maintain a tight relationship between the occupant and the sled when the same is to be used for jumps or for high speed when reverse curves are encountered.

In order that the occupants may leave the sled both at the front and the rear, I depress the hand rail at the front as illustrated at 9 and I depress the same at the stern as illustrated at 10 to thereby provide an assembly that will prevent the occupants sliding from the sled or to prevent the sled sliding from under the occupants.

Metal shoes 10 and 11 are provided upon the forward end and upon the stern to thereby firmly secure the boards together and to give it strength and stability for hard use.

I provide a brake shoe 12. The brake shoe 12 is supported by brake bars 13. The brake bar 13 is hingedly secured to one of the stanchions 5 by any suitable pivot pin 14 and the brake bar is furcated at its ends as illustrated at 15 and 16 in Fig. IX, and the brake shoe is secured thereto by any suitable fastenings as through the use of rivets 17. The brake shoe is preferably made channel shaped having side walls 18 and 19 and having a rear wall 20 and it is sharpened at its lower end as illustrated at 21 to facilitate its penetrating the surface over which the sled runs.

The brake shoes are preferably made two in number and are placed at either side and at the stern of the sled. The pointed end of the brake shoe passes through a slit 22 disposed at the bottom of the sled and I provide a rubber head 23 at the top of the brake shoe to facilitate its manual manipulation with both hands of the rear occupant of the sled and to simultaneously provide a suitable knob for the rear occupant to hold to.

The brake shoe is normally maintained operative through the use of a coil spring 24. The coil spring 24 is secured upon its one end to a pin 25 secured to the rear stanchion and to its opposite end to a pin 26 that passes through the bars 15 or 16 and an additional hole 27 is provided within the bar to permit adjustment with the tension of the spring 24.

A cross tiller bar 28 is provided. The tiller bar 28 runs transversely of the sled and is secured to a steering post 29. I provide a smoothed top housing 30 for the steering assembly and through the top of this steering post 29 passes the support 30 which is recessed upon its interior as illustrated at 31 in which the steering arm 32 may be manipulated.

A steering pinion 33 is disposed upon the steering post 29 and it coacts with a gear rack segment 34 to permit the manipulation of the steering arm 32. The steering arm 32 is secured to the rudder post 35 and the rudder post 35 runs through a base plate 36 and is secured to the rudder 37 disposed centrally and beneath the front end of the base of the sled and to the rudder post 35.

In order that the sled may be maintained in substantial alignment, I provide a plurality of guide shoes 38 here shown as two in number. These shoes are formed integral with a plate 39 and form the terminal edges of the same. The shoes are knife edged as illustrated at 40 and the same extend immediately below the bottom of the sled and are made to penetrate and engage within the surface over which the sled runs.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a sled made up of a plurality of base runner boards, a hand rail disposed about the peripheral edge of the base runner boards upwardly extending therefrom between its ends and in direct contact therewith at its ends and a tiller and rudder support fixedly secured to the top side of the base runner boards, a rudder post rotatably secured to the support and a rudder secured to the rudder post upon its lower end and a steering arm secured to the rudder post at its top end with said steering arm having a rack segment formed integral therewith, a steering pinion coacting with the rack of the steering arm, and a tiller bar secured to the steering post and adapted for actuating the rudder in fixed relation with the movement of the tiller bar.

2. In a device of the class described, the combination of a plurality of base runner boards, cross supports secured to the top side of the base runner boards, said cross bars being upturned at their ends, a hand rail passing through the upturned ends of the cross supports with said hand rail being made of a rubber sheath having a rope disposed central thereof, and said hand rail being in spaced relation with the top side of the base runner boards between their ends and in immediate contact therewith at the front end of the top side of the runner boards.

3. In a device of the class described, the combination of a plurality of base runner boards, cross bars disposed transversely of and at the top side of the runner boards and secured thereto, said cross bars being upturned at their ends to form stanchions, a tubular member terminating the upturned end of each of the cross bars, a hand rail made of a rubber sheath having a rope disposed therein passing through the tubular members disposed at the top bar of each of the stanchions, and said hand rail extending around the edge of the sled and spaced apart from the runners of the sled, and guide shoes disposed adjacent the stern of the sled and downwardly extending and outwardly extending from the base of the rudder boards, and said guide shoes being knife edged.

DATUS O. PERRY.